United States Patent
Gers-Barlag et al.

(10) Patent No.: US 12,479,948 B2
(45) Date of Patent: Nov. 25, 2025

(54) LADDER COPOLYMER

(71) Applicant: BYK-Chemie GmbH, Wesel (DE)

(72) Inventors: Alexander Gers-Barlag, Wesel (DE); Guillaume Jaunky, Wesel (DE); Viktor Fertich, Wesel (DE); Mark Heekeren, Sonsbeck (DE); Mirco Süselbeck, Oberhausen (DE); Nadine Waschilowski, Krefeld (DE)

(73) Assignee: BYK-Chemie GmbH, Wesel (DE)

( * ) Notice: Subject to any disclaimer, the term of this patent is extended or adjusted under 35 U.S.C. 154(b) by 435 days.

(21) Appl. No.: 18/023,807

(22) PCT Filed: Aug. 30, 2021

(86) PCT No.: PCT/EP2021/073874
§ 371 (c)(1),
(2) Date: Feb. 28, 2023

(87) PCT Pub. No.: WO2022/049028
PCT Pub. Date: Mar. 10, 2022

(65) Prior Publication Data
US 2023/0312802 A1    Oct. 5, 2023

(30) Foreign Application Priority Data
Sep. 2, 2020  (EP) .................... 20194190

(51) Int. Cl.
*C08F 290/06* (2006.01)
*C08F 230/08* (2006.01)
*C08F 283/12* (2006.01)
*C08G 77/442* (2006.01)
*C08G 77/46* (2006.01)
*C09D 151/08* (2006.01)

(52) U.S. Cl.
CPC ........ *C08F 290/068* (2013.01); *C08F 230/08* (2013.01); *C08F 283/128* (2013.01); *C08G 77/442* (2013.01); *C08G 77/46* (2013.01); *C09D 151/085* (2013.01)

(58) Field of Classification Search
CPC .... C08G 77/46; C08F 230/08; C08F 290/068; C08F 283/12
See application file for complete search history.

(56) References Cited

U.S. PATENT DOCUMENTS

| | | | |
|---|---|---|---|
| 5,760,100 A | * | 6/1998 | Nicolson .......... B29D 11/00076 528/33 |
| 2002/0016383 A1 | * | 2/2002 | Iwata ................. C08F 290/061 351/159.04 |
| 2010/0093963 A1 | | 4/2010 | Ichinohe |
| 2011/0140292 A1 | * | 6/2011 | Chang .................... G02B 1/043 264/1.1 |
| 2012/0190760 A1 | | 7/2012 | Henning et al. |
| 2018/0100038 A1 | * | 4/2018 | Jing ...................... C08G 77/46 |
| 2019/0112496 A1 | | 4/2019 | McVay et al. |
| 2019/0144588 A1 | | 5/2019 | Temel |

FOREIGN PATENT DOCUMENTS

| CN | 108219142 | | 6/2018 | |
|---|---|---|---|---|
| JP | 2010095589 | | 4/2010 | |
| JP | 2010138328 | | 6/2010 | |
| JP | 2011241388 | | 7/2011 | |
| JP | 2014091831 | | 5/2014 | |
| JP | 2019531515 A | * | 10/2019 | ............. C08G 77/20 |
| WO | 2017036612 | | 3/2017 | |
| WO | 2019020542 | | 1/2019 | |

OTHER PUBLICATIONS

International Preliminary Report on Patentability for Application No. PCT/EP2021/073874 mailed Aug. 24, 2022.
International Search Report and Written Opinion for Application No. PCT/EP2021/073874 mailed Feb. 12, 2021.

* cited by examiner

*Primary Examiner* — Marc S Zimmer

(57) ABSTRACT

The invention relates to a polymer comprising a) at least two polymer backbone chains and b) at least one polymeric connecting chain comprising at least two polyether segments and one polysiloxane segment, said polysiloxane segment having a number average molecular weight in the range of 400 to 6000 g/mol, and at least one of the at least two polyether segments being positioned between the polymer backbone chains and the polysiloxane segment, wherein the at least two polymer backbone chains are linked by the at least one polymeric connection chain.

15 Claims, No Drawings

LADDER COPOLYMER

The invention relates to a polymer comprising at least two polymer backbone chains and at least one polymeric connecting chain, wherein the at least two polymer backbone chains are linked by the at least one polymeric connecting chain. The invention further relates to a process for preparing the polymer, to a composition comprising the polymer, to a coating system formed from the composition, and to the use of the polymer.

WO 2019/020542 A1 relates a polymer having a) a polymer backbone and b) one or more polymeric side chains covalently linked to the polymer backbone, wherein the polymeric side chains comprise a polyether segment and a polysiloxane segment, said polysiloxane segment having a number average molecular weight in the range of 1050 to 6000, and said polyether segment being positioned between the polymer backbone and the polysiloxane segment. The polymers described in this document can be used as additive in coating compositions to modify the surface properties of coatings prepared from the compositions.

US 2019/0144588 A1 relates to copolymers AB having moieties derived from vinyl-terminated polysiloxanes A with more than one vinyl group bound to the polysiloxane, and moieties derived from two or more alkyl esters B of an olefinically unsaturated carboxylic acid, wherein at least two different alkyl esters B1 and B2 are used; the alkyl group of the first alkyl ester B1 of an olefinically unsaturated carboxylic acid has from one to five carbon atoms, the alkyl group of the second alkyl ester B2 of an olefinically unsaturated carboxylic acid has from six to thirty carbon atoms, and moieties derived from at least one hydroxyalkyl ester B3 of an olefinically unsaturated carboxylic acid, the ester B3 having at least one hydroxyl group in the alkyl group, and from two to six carbon atoms in the alkyl group, to a process for their preparation, and to a method of use thereof as flow modifiers in coating compositions.

There is an ongoing need for improved additives to control surface properties of compositions. More in particular, there is a delicate balance between desired surface properties like slip, levelling, dirt repellency, and self-cleaning properties on the one hand, and undesired surface properties, like insufficient over-coating properties and surface imperfections like poor leveling and craters, on the other hand. In many cases, additives providing one or more of the desired surface properties cause undesired surface properties as well. The invention seeks to provide a polymer suitable as additive having an improved balance of causing desired and undesired surface properties. Furthermore, the polymer suitable as additive should not deteriorate other properties, such as mechanical properties, weathering resistance and corrosion protection. The polymer should preferably be effective in controlling surface properties when added to compositions in small amounts.

The invention provides a polymer comprising
 a) at least two polymer backbone chains and
 b) at least one polymeric connecting chain comprising at least two polyether segments and one polysiloxane segment, said polysiloxane segment having a number average molecular weight in the range of 400 to 6000 g/mol, and at least one of the at least two polyether segments being positioned between the polymer backbone chains and the polysiloxane segment,
wherein the at least two polymer backbone chains are linked by the at least one polymeric connection chain.

The polymer according to the invention is suitable as additive having an improved balance of causing desired and undesired surface properties. Furthermore, the polymer suitable as additive does not deteriorate other properties, such as mechanical properties, weathering resistance and corrosion protection. Furthermore, the polymer is effective in controlling surface properties when added to compositions in small amounts.

The polymer of the invention has at least two polymer backbone chains. The polymer backbone chains are linear or branched polymers having repeating units. Preferably, the polymer backbone chains have a substantially or entirely linear structure. Generally, the type of polymer which forms the polymer backbone chains is not particularly limited and can be chosen from the polymer types know to the skilled person. Examples of suitable polymer types include polyesters, polyurethanes, polycarbonates, and polymers and copolymers of polymerizable ethylenically unsaturated monomers. In view of the wide variety of available ethylenically unsaturated monomers having further functional groups, polymers and copolymers, collectively referred to as (co)polymers, of such monomers are preferred as polymer backbones. Examples of suitable ethylenically unsaturated monomers are vinylesters, vinylethers, vinylaromatic compounds, such as styrene, acrylic and methacrylic acid as well as esters and amides thereof, collectively referred to as (meth)acrylates. In preferred embodiments, the polymer backbone chains comprise at least 50%, more preferred at least 75% by weight, of polymerized units of (meth)acrylates.

The polymer of the invention generally has a weight average molecular weight in the range of from 2000 to 200000 g/mol, preferably of from 2500 to 150000 g/mol, more preferably of from 3000 to 100000 g/mol, even more preferably of from 3500 to 75000 g/mol, still more preferably of from 4000 to 50000 g/mol, yet more preferably of from 4250 to 25000 g/mol, in particular of from 4500 to 15000 g/mol, most preferably of from 5000 to 10000 g/mol. The weight average molecular weight of the inventive polymers can be determined via GPC using polystyrene standards and tetrahydrofuran as eluent.

In the polymer of the invention at least two polymer backbone chains are linked by at least one polymeric connection chain. Generally, the polymeric connecting chains are covalently linked to the polymer backbone chains. The resulting structure may also be referred to as ladder polymer. Typically, two or more polymeric connecting chains are covalently linked to the polymer backbones. The polymeric connecting chains comprise at least two polyether segments and one polysiloxane segment. At least one of the at least two polyether segments is located between a polymeric backbone and the polysiloxane segment. In one embodiment, the polymeric connecting chains consist essentially of two polyether segments and one polysiloxane segment. In another embodiment, the two polyether segments are located between a polymeric backbone and the polysiloxane segment. In other embodiments, the polymeric connecting chains may have further segments. Examples of further segments include polyester segments. In one embodiment, the individual polymeric connecting chains have the same type of segments. In other embodiments, polymeric connecting chains with different types of segments may be present.

The polysiloxane segment of the polymeric connecting chains has a number average molecular weight in the range of 400 to 6000 g/mol, preferably 900 to 4000 g/mol, and more preferably 1000 to 3000 g/mol. The number average molecular weight range of the polysiloxane segment is believed to cause an improved balance of desired and undesired surface properties.

The polysiloxane segment generally has repeating units of the formula —[OSiR$^1$R$^2$]—. The number of repeating units is generally in the range of 4 to 80. The groups R$^1$ and R$^2$ represent, independent of each other, alkyl groups having 1 to 8 carbon atoms, aryl groups selected from phenyl and alkylphenyl, the latter having 1 to 9 carbon atoms in the alkyl group. In preferred embodiments, R$^1$ and R$^2$ represent methyl groups.

The polyether segments generally have a number average molecular weight in the range of 88 to 3000 g/mol. In a preferred embodiment, 132 to 2000 g/mol, more preferably 132 to 1000 g/mol.

The polyether segments generally comprise polymerized units of alkylene oxides. The alkylene oxides are preferably selected from ethylene oxide, propylene oxide, and combinations thereof. It is particularly preferred, that the polyether segments comprise or consist of polymerized units of ethylene oxide. If the polyether segment comprises polymerized units of more than one type of alkylene oxide, such units can be arranged statistically, as a gradient, or in blocks. The number of polymerized alkylene oxide units in the polyether segment generally is in the range of 1 to 70, such as 3 to 45, or 5 to 22.

The number average molecular weight of polysiloxane and polyether segments can be determined using GPC.

In a preferred embodiment, at least one of the polymer backbone chains of the polymer of the invention has at least one pendant polymer chain comprising at least two polyether segments and one polysiloxane segment, said polysiloxane segment having a number average molecular weight in the range of 400 to 6000 g/mol, and at least one of the at least two polyether segments being positioned between the polymer backbone chain and the polysiloxane segment.

Generally, the polymer of the invention comprises 2 to 4 pendant polymer chains as described above.

In some embodiments, the polymer of the invention has functional groups, in particular functional groups, which are capable of participating in curing reactions of the composition to which the polymer of the invention is added to improve surface properties. The type of functional groups is not particularly limited and may be selected to match functional groups which may be present in a composition to which the polymer is added. In preferred embodiments, the polymer comprises functional groups comprising at least one of hydroxyl group, carboxylic acid group, amino group, etherified amino group, amide group, epoxide group, and alkoxysilyl group.

Preference is given to polymers of the invention having at least one hydroxyl group per molecule and a hydroxyl number in the range of 1 to 250 mg KOH/g, preferably 5 to 200 mg KOH/g, and more preferably 10 to 100 mg KOH/g.

The polysiloxane content of the polymer of the invention generally is in the range of 0.5 to 5.0% by weight, calculated on the weight of the polymer. In preferred embodiments, the polysiloxane content is in the range of 1.0 to 4.5% by weight, and more preferred in the range of 1.5 to 4.0% by weight.

The acid number of the polymer generally is in the range of 0.0 to 30.0 mg KOH/g.

A further subject-matter of the invention is a composition comprising a) the polymer according to the invention in an amount of 0.01 to 15.00% by weight, based on the total non-volatile content of the composition, and b) a binder, which is different from said polymer a).

Said composition preferably contains the polymer of the invention in an amount of from 0.01 to 10% by weight, preferably of from 0.20 to 8.00% by weight, more preferably of from 0.30 to 7.00% by weight or of from 0.30 to 6.00% weight or of from 0.30 to 5.00% by weight, in particular of from 0.50 to 5.00% by weight, based in each case on the total weight of the non-volatile content of the composition.

The polymers of the invention can be included in the composition as 100% substances, as a solution, as dispersion or as an emulsion.

The properties of the compositions, in particular of coating compositions, moulding compounds and cosmetic formulations are not impaired by the amount of the inventive polymer present therein. The presence or use of these polymers does not have a negative effect e.g. in respect of corrosion protection, gloss preservation, weather resistance and/or mechanical strength of the coatings obtained from these compositions.

The polymer of the invention is very suitable to control surface properties in compositions, such as coating compositions, molding composition, pre-polymer compositions, cosmetic formulations, and the like. Therefore, the invention also relates to the use of the polymer according to the invention as an additive in a composition to control one or more properties of the composition selected from levelling, surface-slip, cratering, telegraphing, overcoatability, cissing, open time, dirt adhesion, self-cleaning, air draft sensitivity, fogging, and electrostatic properties.

Cissing is a coating defect, which can be defined as the gathering of a wet film into drops or streaks leaving parts of the surface to be coated bare or imperfectly covered. The surface to be coated may be the surface of a substrate or the surface of a previously applied coating layer. Cissing can occur in organic solvent-based coatings as well as water-based coatings.

Therefore, the invention also relates to the use of the polymer according to the invention as an additive in a composition to control one or more properties of the composition selected from levelling, surface-slip, cratering, telegraphing, overcoatability, cissing, open time, dirt adhesion, self-cleaning, air draft sensitivity, fogging, and electrostatic properties. The use can also be described as a process of controlling one or more of the above-mentioned properties of a composition, wherein the process comprises adding the polymer of the invention to the composition. In a preferred embodiment, the polymer of the invention is added in an amount of 0.01 to 15.00% by weight, based on the total non-volatile content of the composition.

In a still further aspect, the invention relates to processes for preparing the polymer of the invention.

In a preferred embodiment, the process for preparing the polymer of the invention comprises polymerizing a monomer mixture comprising a) a polyether-modified polysiloxane having at least two polyether segments and at least two polymerizable ethylenically unsaturated groups attached to at least two of the at least two polyether segments, and one polysiloxane segment, said polysiloxane segment having a number average molecular weight in the range of 400 to 6000 g/mol, and said polysiloxane segment being positioned between the at least polyether segments, and b) at least one other further monomer having one polymerizable ethylenically unsaturated group.

The polyether-modified polysiloxane having at least two polyether segments and at least two polymerizable ethylenically unsaturated groups attached to at least two of the at least two polyether segments is suitably prepared by
i) providing
   a) a monomer having one polymerizable ethylenically unsaturated group and one further functional group which is different from the polymerizable ethylenically unsaturated group, and
   b) a molecule having two groups which are reactive towards said one further functional group, at least 2 polyether segments, and a polysiloxane segment, said polysiloxane segment having a number average molecular weight in the range of 400 to 6000, and said polyether segment being positioned between said group which is reactive towards said one further functional group and the polysiloxane segment,
ii) forming two covalent bonds between the monomer a) and the molecule b) by reacting two further functional groups with the group which is reactive towards said one further functional group.

In a further embodiment, the polyether-modified polysiloxane having at least two polyether segments and at least two polymerizable ethylenically unsaturated groups attached to at least two of the at least two polyether segments is prepared by
i) providing
   a) a monomer having one polymerizable ethylenically unsaturated group, a polyether segment, and one further ethylenically unsaturated functional group which is different from the polymerizable ethylenically unsaturated group, and wherein the polyether segment is located between the polymerizable ethylenically unsaturated group and the further ethylenically unsaturated functional group,
   b) a molecule having a polysiloxane segment having a number average molecular weight in the range of 400 to 6000 and at least 2 Si—H groups, and
ii) forming covalent bonds between the monomer a) and the molecule b) by a hydrosilylation reaction of the Si—H group on the further ethylenically unsaturated functional group.

For a more detailed description of such a process, reference is made to international patent application WO 2017/036612, in particular pages 13 to 48 of that publication.

The invention further relates to a composition comprising
a) the polymer of the invention in an amount of 0.01 to 15.00% by weight, based on the total non-volatile content of the composition, and
b) a binder, which is different from said polymer a).

Said composition preferably contains the polymer of the invention in an amount of from 0.01 to 10.00% by weight, preferably of from 0.20 to 8.00% by weight, more preferably of from 0.30 to 7.00% by weight, or of from 0.30 to 6.00% by weight or of from 0.30 to 5.00% by weight, in particular of from 0.50 to 5.00% by weight, based in each case on the total weight of the non-volatile content of the composition.

The polymers of the invention can be included in the composition as 100% substances, as a solution, as dispersion or as an emulsion.

The properties of the compositions, in particular of coating compositions, moulding compounds and cosmetic formulations are not impaired by the amount of the inventive polymer present therein. The presence or use of these polymers does not have a negative effect e.g. in respect of corrosion protection, gloss preservation, weather resistance and/or mechanical strength of the coatings obtained from these compositions.

In a typical embodiment, the composition is liquid at ambient temperature, for example at a temperature of 20° C. In some embodiments, the polymer according to the invention and or the binder present in the composition are liquid. In such cases, the composition may be liquid at ambient temperature without the need of a liquid volatile diluent. In other embodiments, it may be required or desirable to render the composition liquid or to achieve a desired viscosity by including a volatile diluent. The volatile diluent may be water or an organic solvent, or mixtures thereof. Hence, the composition may be an aqueous composition or a non-aqueous composition.

The inventive compositions comprise at least one binder. All customary binders known to the skilled person are suitable as binder component of the composition of the invention. The binder used in accordance with the invention preferably has crosslinkable functional groups. Any customary crosslinkable functional group known to the skilled person is contemplated here. More particularly the crosslinkable functional groups are selected from the group consisting of hydroxyl groups, amino groups, carboxylic acid groups, and unsaturated carbon double bonds, isocyanates, polyisocyanates, and epoxides such as ethylene oxides. The binder may be exothermically or endothermically crosslinkable or curable. The binder is crosslinkable or curable preferably in a temperature range from −20° C. up to 250° C. The binder is preferably selected from the group consisting of epoxide resins, polyesters, wherein the polyesters may be unsaturated, vinyl ester-based resins, poly (meth)acrylates, polyurethanes, polyureas, polyamides, polystyrenes, polyethers, polycarbonates, polyisocyanates, and melamine formaldehyde resins. These polymers may be homopolymers or copolymers. These resins and their preparation are known to the skilled person.

The composition of the invention can be provided as a one-component system or as a two-component system.

The composition of the invention preferably comprises the binder in an amount of 3 to 90% by weight, preferably in an amount of 5 to 80% by weight, more preferably in an amount of 10 to 75% by weight, based on the total weight of the composition.

Depending on the desired application, the composition of the invention may comprise one or more customarily employed additives as component. These additives are preferably selected from the group consisting of emulsifiers, flow control assistants, solubilizers, defoaming agents, stabilizing agents, preferably heat stabilizers, process stabilizers, and UV and/or light stabilizers, catalysts, waxes, flexibilizers, flame retardants, reactive diluents, adhesion promoters, organic and/or inorganic nanoparticles having a particle size<100 nm, process aids, plasticizers, fillers, glass fibers, reinforcing agents, additional wetting agents and dispersants, light stabilizers, ageing inhibitors and mixtures of the aforesaid additives. Said additive content of the composition of the invention may vary very widely depending on intended use. The content, based on the total weight of the composition of the invention, is preferably 0.01 to 10.00% by weight, more preferably 0.01 to 8.00% by weight, very preferably 0.01 to 6.00% by weight, especially preferably 0.01 to 4.00% by weight, and particularly 0.01 to 2.00% by weight, calculated on the total weight of the composition. The inventive compositions may be used in pigmented or unpigmented form and may also comprise fillers such as calcium carbonate, aluminum hydroxide, reinforcing fibers such as glass fibers, carbon fibers and aramid fibers.

The coating compositions of the invention are preferably coating compositions for producing anti-static coatings, antifogging coatings, self-cleaning facade coatings, car coatings, dirt-instrument coatings, marine coatings (anti-fouling coatings), and primer coatings. Owing to the outstanding compatibility of the copolymers, they are also outstandingly suitable for producing transparent coatings.

The compositions of the invention may be applied to a large number of substrates, such as wood, paper, glass, ceramic, plaster, concrete and metal, for example. In a multi-coat process the coatings may also be applied to primers, primer-surfacers or basecoats. Curing of the compositions depends on the particular type of crosslinking and may take place within a wide temperature range from, for example, −10° C. to 250° C. In a preferred embodiment, the substrate is a motor vehicle or a part thereof. Examples of motor vehicles are passenger cars, buses, trucks, trains, aircrafts, as well as motor driven agricultural and construction equipment.

The preferably polymeric moulding compounds of the invention preferably comprise at least one polymer selected from the group consisting of lacquer resins, alkyd resins, polyester resins, epoxy resins, polyurethane resins, unsaturated polyester resins, vinyl ester resins, polyethylene, polypropylene, polyamides, polyethylene terephthlate, PVC, polystyrene, polyacrylonitrile, polybutadiene, polyvinyl chloride or mixtures of these polymers or any copolymers thereof.

When the composition comprising the polymer of the invention is a coating composition, the coating composition are very suitable for preparing multilayer coating systems on a substrate. The multilayer coating systems comprise at least one undercoat layer and at least one topcoat layer, wherein at least one layer is based on a composition of the invention. In a preferred embodiment, the undercoat layer and the topcoat layer are based on a composition of the invention. Preferably, the undercoat layer and the topcoat layer have a common layer boundary. The undercoat layer and the topcoat layer may be prepared from different coating compositions, for example from a pigmented base coat composition for the undercoat layer and a non-pigmented clearcoat composition for the topcoat layer. Alternatively, the undercoat layer and the topcoat layer may be prepared from the same coating composition. In preferred embodiments, the substrate is a motor vehicle or a part thereof.

A further subject of the invention is a process of forming a multilayer coating system on a substrate comprising the steps of
 i) applying a coating composition a) to a substrate to form a coating layer a) and
 ii) applying a coating composition b) to form a coating layer b) on top of coating layer a), wherein at least one of coating composition a) or coating composition b) comprises the polymer of the invention in an amount of 0.01 to 15.00% by weight, based on the total non-volatile content of the coating composition.

EXAMPLES

Raw Materials:

Isobutanol (iBuOH) was used as solvent for all polymerizations.

|  | description |
|---|---|
| EHA | 2-ethylhexyl acrylate |
| BA | Butyl acrylate |
| HEMA | Hydroxyethyl methacrylate |
| α-MSD | α-methylstyrene dimer |
| Silicone component 1 | divinyl terminated polydimethylsiloxane having a viscosity of approx. 20 mm$^2$/s at 25° C. |
| Silicone component 2 | polyether-modified polydimethylsiloxane having the theoretical structure of $M^R D_{24} M^R$ and R = —(CH$_2$)$_3$-EO$_{11}$/PO$_4$—OH |
| Silicone component 3 | Acryloxy functional polyether-modified polydimethylsiloxane with a silicone compound having the theoretical structure of $M^R D_{24} M^R$ and R = —(CH$_2$)$_3$-EO$_{11}$/PO$_4$—OH and whereas approx. 40% of the hydroxyl groups have been acrylated. |
| Silicone component 4 | Acryloxy functional polyether-modified polydimethylsiloxane with a silicone compound having the theoretical structure of $M^R D_{24} M^R$ and R = —(CH$_2$)$_3$-EO$_{11}$/PO$_4$—OH and whereas approx. 80% of the hydroxyl groups have been acrylated. |
| AMBN | Azobisisobutyronitrile |

The number average and weight average molecular weights and the molecular weight distribution were determined according to DIN 55672-1:2007-08 at 40° C. using a high-pressure liquid chromatography pump (WATERS 600 HPLC pump) and a refractive index detector (Waters 410). A combination of 3 Styragel columns from WATERS with a size of 300 mm×7.8 mm ID/column, a particle size of 5 µm and pore sizes HR4, HR2 and HR1 was used as separating columns. The eluent used for the copolymers was tetrahydrofuran filtered through a 0.2 µm membrane filter with an elution rate of 1 ml/min. The conventional calibration was carried out using Polystyrene standards. Molecular weights reported and referred to in this document always have the unit g/mol.

General Procedure for the Preparation of Comparative Examples C1 and C2

The required amounts of solvent and monomers are specified in Table 1. In a 4-necked round glass flask connected to a reflux condenser, a temperature sensor, a N$_2$ gas inlet and a dropping funnel, isobutanol was heated to reflux (approx. 107° C.) under a constant N$_2$ gas flow. The monomers and azobisisobutyronitrile as the initiator (4 parts) were homogenized and metered into the reaction mixture at a uniform rate over a period of 3 hours. After the end of the addition the reaction temperature was maintained at refluxing conditions for 0.5 h. Thereafter, two times azobisisobutyronitrile (0.1 parts) were added at 1 h intervals. After stirring the reaction mixture under refluxing conditions for 1 h, the reaction mixture was cooled to ambient conditions. The product was characterized by gel permeation chromatography and the $M_W$ was determined (Table 1).

Procedure for the Preparation of Comparative Example C3

In a 4-necked round glass flask connected to a reflux condenser, a temperature sensor, a $N_2$ gas inlet and a dropping funnel, 34.7 parts isobutanol were heated to reflux (approx. 107° C.) under a constant $N_2$ gas flow. 24 parts 2-ethylhexyl acrylate, 23 parts butyl acrylate, 10.2 parts hydroxyethyl methacrylate and azobisisobutyronitrile as the radical initiator (4 parts) were homogenized and metered into the reaction mixture at a uniform rate over a period of 3 hours. After the end of the addition the reaction temperature was maintained at refluxing conditions for 0.5 h. Thereafter, two times azobisisobutyronitrile (0.1 parts) were added at 1 h intervals. After stirring the reaction mixture under refluxing conditions for 1 h, the reaction mixture was cooled to ambient conditions. 4 parts of silicone component 2 were added and the mixture homogenized 5 min. The product was characterized by gel permeation chromatography ($M_W$=5595 g/mol).

General Procedure for the Preparation of Inventive Examples E1 to E3

The required amounts of solvent and monomers are specified in Table 1. In a 4-necked round glass flask connected to a reflux condenser, a temperature sensor, a $N_2$ gas inlet and a dropping funnel, isobutanol was heated to reflux (approx. 107° C.) under a constant $N_2$ gas flow. The monomers, chain transfer agent (optionally) and azobisisobutyronitrile as the initiator (4 parts) were homogenized and metered into the reaction mixture at a uniform rate over a period of 3 hours. After the end of the addition the reaction temperature was maintained at refluxing conditions for 0.5 h. Thereafter, two times azobisisobutyronitrile (0.1 parts) were added at 1 h intervals. After stirring the reaction mixture under refluxing conditions for 1 h, the reaction mixture was cooled to ambient conditions. The product was characterized by gel permeation chromatography and the $M_W$ was determined (Table 1).

TABLE 1

Composition of examples C1-C2 and E1-E3, amounts are in parts by weight

| Ex. | iBuOH | EHA | BA | HEMA | α-MSD | Silicone component # | Silicone component amount | Mw [g/mol] |
|---|---|---|---|---|---|---|---|---|
| C1 | 34.6 | 25.5 | 24.5 | 11.2 | | | | 5605 |
| C2 | 34.7 | 24.5 | 23.5 | 10.2 | | 1 | 3.1 | 5882 |
| C3 | 34.7 | 24.0 | 23.0 | 10.2 | | 2 | 4.0 | 5595 |
| E1 | 34.7 | 24.5 | 23.5 | 10.2 | | 3 | 3.1 | 6105 |
| E2 | 34.0 | 24.0 | 23.0 | 10.0 | 2.0 | 3 | 3.0 | 6145 |
| E3 | 34.0 | 24.0 | 23.0 | 10.0 | 2.0 | 4 | 3.0 | 6434 |

The preparation of the solvent-borne clear coat is separated into several steps for better clarity. The steps are:
 a) Preparation of the liquid formulation
 b) Application, curing and evaluation Preparation of the Liquid Formulation of a Solvent-Borne Clear Coat

TABLE 2

| Binder component | Description | Parts by weight |
|---|---|---|
| Synthalat A 086 HS | Polyacrylate polyol ex Synthopol | 82.1 |
| Butyl acetate | Solvent | 8.0 |
| Xylene | Solvent | 7.4 |
| 2-Butoxyethyl acetate | Solvent | 1.4 |
| BYK-052 N | Defoamer ex BYK-Chemie GmbH | 0.5 |
| Crosslinker component | | |
| Desmodur N 3390 | Trimer of hexamethylene diisocyanate es Covestro | 20.3 |
| Butyl acetate | Solvent | 29.7 |

The ingredients indicated in Table 2 were mixed and homogenized to form a binder component and a crosslinker component.

The binder component was subsequently separated into portions one polymer of the invention or of comparative polymer was added and mixed in. The amount of added polymer was 0.3% by weight of added polymer, calculated on the binder component.

Clear coat compositions were prepared by mixing the binder components with the crosslinker component in a ratio of 2:1 by weight.

Application, Curing and Evaluation

The clear coat compositions were applied to steel panels with a spiral film applicator in a wet film thickness of 50 µm. The applied clear coats were allowed to dry and cure for 24 hours at room temperature.

The coefficient of friction (COF) was determined with an Altek measurement device using a weight of 500 g and self-adhesive felt. The readings of the instrument were multiplied by a factor of 0.02.

Overcoatability was tested by applying second clear coat layer on the cured clear coats described above. The second clear coat layer contained no polymer of the invention or comparative polymer. The flow and leveling of the second clear coat layer were judged on a scale of 1 (very good) to 5 (poor). The leveling of the first layer was determined using a wavescan apparatus ex BYK-Gardner. The long-wave (LVV) and short-wave (SW) values were recorded.

Crater formation of each layer was judged visually on a scale from 1 (no craters) to 5 (severe crater formation).

Haze of each coating layer was judged visually on a scale of 1 (no haze) to 5 (sever haze).

The cross-cut adhesion test was carried out according to DIN EN ISO 2404. The results are reported on a scale of 1 (no delamination) to 5 (severe delamination).

The results are summarized in Table 3.

| Added polymer | Surface tension of first layer (in mN/m) | Coefficient of friction of first layer | Leveling of first layer (Wavescan) | | crater | Leveling of second layer | Cross-cut adhesion of second layer |
|---|---|---|---|---|---|---|---|
| | | | SW | LW | | | |
| none | 25.6 | 0.44 | 20.5 | 11.3 | 5 | 5 | 1 |
| C1 | 25.6 | 0.44 | 33.8 | 32.5 | 5 | 5 | 1 |

-continued

| Added polymer | Surface tension of first layer (in mN/m) | Coefficient of friction of first layer | Leveling of first layer (Wavescan) | | crater | Leveling of second layer | Cross-cut adhesion of second layer |
| --- | --- | --- | --- | --- | --- | --- | --- |
| | | | SW | LW | | | |
| C2 | 26.1 | 0.28 | 14.3 | 17.2 | 3 | 4 | 2 |
| C3 | 24.6 | 0.32 | 11.2 | 20.0 | 1 | 3 | 5 |
| E1 | 26.5 | 0.36 | 11.9 | 16.9 | 1 | 3 | 1 |
| E2 | 25.0 | 0.37 | 10.4 | 15.0 | 1 | 2 | 1 |

From Table 3 it can be concluded that comparative polymer C1 without silicone has no beneficial effect at all. Comparative polymer C2 according to US 2019/0144588 A has a positive effect on levelling. However, the amount of crater formation is unsatisfactory. Also, levelling of the second layer and cross-cut adhesion are not satisfactory. Comparative polymer C3 leads to poor cross-cut adhesion of the second layer.

The polymer according to the invention E1 and E2 show very good overall balance of improved properties, in particular good leveling, no crater formation, and good adhesion of the second layer.

A further series of tests was carried out with clear coats applied by airless spraying to primed steel panels. The wet film layer thickness was 80 μm. Leveling was determined by the Wavescan apparatus. Short-wave and long-wave readings were recorded.

The results are summarized in Table 4.

| | Leveling by Wavescan | |
| --- | --- | --- |
| Added polymer | LW | SW |
| C1 | n.m. | n.m. |
| C2 | 10.7 | 26.8 |
| E1 | 5.4 | 3.2 |
| E2 | 11.4 | 6.7 |
| E3 | 1.8 | 4.5 |

Comparative polymer C1 without silicone provided a surface with very poor leveling that was not measurable using the Wavescan apparatus. Comparative polymer C2 has a positive effect on leveling but is unsatisfactory in the short-wave measurement.

Polymers E1, E2, and E3 according to the invention lead to an overall improved leveling.

The invention claimed is:

1. A polymer comprising
a) at least two polymer backbone chains and
b) at least one polymeric connecting chain comprising at least two polyether segments and one polysiloxane segment, said polysiloxane segment having a number average molecular weight in the range of 400 to 6000 g/mol, and at least one of the at least two polyether segments being positioned between the at least two polymer backbone chains and the polysiloxane segment,
wherein the at least two polymer backbone chains are linked by the at least one polymeric connection chain, and wherein the polymer has a weight average molecular weight in the range of 2000 to 200000 g/mol, determined via GPC using polystyrene standards and tetrahydrofuran as eluent.

2. The polymer according to claim 1, wherein at least one of the at least two polymer backbone chains has at least one pendant polymer chain comprising at least two polyether segments and one polysiloxane segment, said polysiloxane segment of the at least one pendant polymer chain having a number average molecular weight in the range of 400 to 6000 g/mol, and at least one of the at least two polyether segments of the at least one pendant polymer chain being positioned between the at least one of the at least two polymer backbone chains and the polysiloxane segment of the at least one pendant polymer chain.

3. The polymer according to claim 1, wherein the polysiloxane segment has a number average molecular weight in the range of 900 to 4000 g/mol.

4. The polymer according to claim 1, wherein the at least two polymer backbone chains are (co) polymers of polymerizable ethylenically unsaturated monomers.

5. The polymer according to claim 1, wherein the at least two polyether segments, independent of each other, have a number average molecular weight in the range of 88 to 3000 g/mol.

6. The polymer according to claim 1, wherein the at least two polyether segments comprise polymerized units of one or more of ethylene oxide and propylene oxide.

7. The polymer according to claim 1, wherein the polymer further comprises at least one of a hydroxyl group, a carboxylic acid group, an amino group, an etherified amino group, an amide group, an epoxide group, and an alkoxysilyl group.

8. A process for preparing a polymer, the process comprising polymerizing a monomer mixture comprising
a) a polyether-modified polysiloxane having at least two polyether segments and at least two polymerizable ethylenically unsaturated groups attached to at least two of the at least two polyether segments, and one polysiloxane segment, said polysiloxane segment having a number average molecular weight in the range of 400 to 6000 g/mol, and said polysiloxane segment being positioned between the at least two polyether segments, and
b) at least one other further monomer having one polymerizable ethylenically unsaturated group,
the polymer comprising
a) at least two polymer backbone chains and
b) at least one polymeric connecting chain comprising at least two polyether segments and one polysiloxane segment, said polysiloxane segment having a number average molecular weight in the range of 400 to 6000 g/mol, and at least one of the at least two polyether segments being positioned between the at least two polymer backbone chains and the polysiloxane segment,
wherein the at least two polymer backbone chains are linked by the at least one polymeric connection chain, and wherein the polymer has a weight average molecular weight in the range of 2000 to 200000 g/mol, determined via GPC using polystyrene standards and tetrahydrofuran as eluent, and wherein the at least two polymer backbone chains are (co)polymers of polymerizable ethylenically unsaturated monomers.

9. The process according to claim 8, wherein the monomer mixture further comprises a second polyether-modified polysiloxane having at least two polyether segments and one polymerizable ethylenically unsaturated group attached to one of the at least two polyether segments, and one polysiloxane segment, said polysiloxane segment of said second polyether-modified polysiloxane having a number average molecular weight in the range of 400 to 6000 g/mol, and being positioned between the at least two polyether segments.

10. A composition comprising
a) the polymer according to claim 1 in an amount of 0.01 to 15.00% by weight, based on the total non-volatile content of the composition, and
b) a binder, which is different from said polymer a).

11. The composition according to claim 10, wherein the composition is liquid at a temperature of 20° C. and comprises a volatile diluent.

12. A multilayer coating system on a substrate comprising at least one undercoat layer and at least one top-coat layer, wherein at least one layer of the multilayer coating system is formed from a composition according to claim 10.

13. The multilayer coating system according to claim 12, wherein the substrate is a motor vehicle or a part thereof.

14. A process of forming a multilayer coating system on a substrate comprising the steps of
i) applying a coating composition a) to a substrate to form a coating layer a) and
ii) applying a coating composition b) to form a coating layer b) on top of coating layer a),
wherein at least one of coating composition a) or coating composition b) comprises a polymer in an amount of 0.01 to 15.00% by weight, based on the total non-volatile content of the coating composition,
wherein the polymer comprises
a) at least two polymer backbone chains and
b) at least one polymeric connecting chain comprising at least two polyether segments and one polysiloxane segment, said polysiloxane segment having a number average molecular weight in the range of 400 to 6000 g/mol, and at least one of the at least two polyether segments being positioned between the at least two polymer backbone chains and the polysiloxane segment,
wherein the at least two polymer backbone chains are linked by the at least one polymeric connection chain, and wherein the polymer has a weight average molecular weight in the range of 2000 to 200000 g/mol, determined via GPC using polystyrene standards and tetrahydrofuran as eluent.

15. A composition comprising a binder and an additive, the additive comprising the polymer according to claim 1.

* * * * *